United States Patent [19]
Schreiber et al.

[11] Patent Number: 5,804,615
[45] Date of Patent: Sep. 8, 1998

[54] AQUEOUS EPOXY RESIN COATING WITH ELECTRICALLY CONDUCTIVE PIGMENTS

[75] Inventors: Peter Schreiber, Hattingen; Reinhard Windmann, Wuppertal; Dieter Hüber, Kerpen; Stefanie Goecke, Ennepetal, all of Germany

[73] Assignee: Herberts Gesellschaft Mit Beschrankter Haftung, Wuppertal, Germany

[21] Appl. No.: 764,899

[22] Filed: Dec. 16, 1996

[30] Foreign Application Priority Data

Dec. 22, 1995 [DE] Germany .................. 195 48 215.8

[51] Int. Cl.$^6$ .............................. C08K 3/20; C08L 63/02; C08L 63/00; C08L 63/04
[52] U.S. Cl. ..................... 523/414; 523/406; 523/412; 523/415; 523/417; 523/420
[58] Field of Search ................................. 523/414, 406, 523/412, 415, 417, 420

[56] References Cited

U.S. PATENT DOCUMENTS

| | | | |
|---|---|---|---|
| 4,655,966 | 4/1987 | Guillaumon et al. | 252/518 |
| 4,891,394 | 1/1990 | Savin | 523/442 |
| 4,981,729 | 1/1991 | Zaleski | 428/412 |
| 4,981,730 | 1/1991 | Zaleski | 524/523 |
| 5,418,264 | 5/1995 | Obloh et al. | 523/414 |
| 5,569,685 | 10/1996 | Schreiber et al. | 523/406 |
| 5,624,978 | 4/1997 | Soltwedel et al. | 523/402 |

FOREIGN PATENT DOCUMENTS

| | | |
|---|---|---|
| 2105261 | 3/1994 | Canada . |
| 42 29 981 | 3/1994 | Germany . |
| 44 07 121 | 5/1995 | Germany . |

OTHER PUBLICATIONS

5 Feb. 1987, "Conductive Aqueous Paint with Antistatic Function", Derwent Publications Ltd., London (Abstract).
"Carbon" Encyclopedia of Chemical Technology, Kirk–Othmer, vol. 4, Fourth Edition 1992, pp. 949–1074.

*Primary Examiner*—Robert E. Sellers
*Attorney, Agent, or Firm*—Merchant, Gould, Smith Edell, Welter & Schmidt, P.A.

[57] ABSTRACT

This invention relates to an aqueous coating composition based on epoxy resins for coating plastic substrates. It contains

- 7.5 to 25 wt. % of one or more epoxy resins
- 1.5 to 10 wt. % of one or more water-miscible polyamines
- 0 to 10 wt. % of one or more chlorinated and/or non-chlorinated polyolefins
- 1 to 35 wt. % of electrically conductive pigments and/or extenders
- 5 to 25 wt. % of one or more organic solvents and
- 35 to 60 wt. % of water wherein the sum of the above-stated constituents amounts to 100 wt. % and the coating composition additionally contains conventional lacquer additives, pigments and/or extenders and optionally further binders.

10 Claims, No Drawings

AQUEOUS EPOXY RESIN COATING WITH ELECTRICALLY CONDUCTIVE PIGMENTS

This invention relates to aqueous coating compositions based on epoxy resins for coating plastic substrates, to a process for coating plastic substrates and to the use of the coating compositions.

Increasing use is being made of mouldings made from plastic substrates in the automotive industry. Such plastic mouldings consist of polypropylene or other thermoplastics or thermosets. In particular, polypropylenes in pure or modified form (PP blends) are becoming ever more widely used due to their excellent properties in comparison with other plastics. They may be coated with plain or effect colours with or without pretreatment.

The problems which in particular occur when coating polypropylene plastic components for exterior applications, such as irregular film formation and inadequate substrate adhesion may be overcome by physical/chemical pretreatment processes, such as for example flame treatment or low pressure plasma activation, by which means a polar and thus straightforwardly coatable substrate surface may be created. Coating systems having an elevated solvent content have hitherto been used for this purpose.

Coating systems are also available which contain chlorinated polyolefins dissolved in organic solvents either alone or in a film-forming polymer (U.S. Pat. No. 4,303,697, U.S. Pat. No. 4,070,421, U.S. Pat. No. 3,597,489). The chlorinated polyolefins effect excellent adhesion, in particular on polypropylene substrates. Pretreatment of the plastic substrates is thus unnecessary. Chlorination ensures sufficient solubility in organic solvents such as for example toluene or xylene.

The chlorinated polyolefins are also usable in aqueous coating systems, which generally contain small quantities of organic solvents and are usable inter alia as primers. WO90-12 056, WO90-12 656 and WO93-01 244 describe aqueous compositions which contain chlorinated polyolefins, which may be applied onto plastic substrates and which may then be coated with successive coating compositions. Coating compositions may also be produced from the aqueous compositions by adding, for example, polyurethane resins. However, the aqueous coating systems exhibit problems with regard to water resistance and adhesion to the substrate, which results in lacquer adhesion defects in successive layers and thus in optical and mechanical damage.

According to DE 44 07 121, aqueous coating systems based on epoxy resins with polyamines as crosslinking agents are used for plastic substrates, the systems containing chlorinated polyolefins and being virtually solvent-free. They may be used as primers and ensure good adhesion at high and low temperatures and when exposed to water.

Plastic components coated in the stated manner may receive successive layers applied in the conventional manner, for example by spraying, roller application, dipping. Due to the absence of polarity, the described coating systems for plastic substrates are not suitable for the use of electrostatic application methods for successive layers.

Sufficient polarity of coatings on plastics for successive electrostatic coating may be achieved by using electrically conductive primers or primer coats. These contain, for example, electrically conductive carbon black or graphite (Glasurit-Handbuch from BASF F+L AG, 1984, page 606 to 607). However, the use of such conductive lacquers is disadvantageous due to their organic solvent content. U.S. Pat. No. 4 981 730 discloses primers for plastic substrates which contain water-dispersible or water-emulsifiable olefin polymers, non-ionic and anionic surfactants, organic solvents and water. The coating compositions may contain crosslinking resins to react with functional groups of a crosslinkable resin in a further coating layer arranged over the primer. Cited examples of these crosslinking resins are amino resins, urethane resins, acrylic resins, epoxy resins, alkyd resins, phenol/formaldehyde resins and mixtures thereof. The coating compositions may also contain conductive pigments.

An aqueous coating composition for plastic substrates is known from EP-A-0 466 136, which composition contains a mixture of an olefin resin, a urethane resin and an epoxy resin as the binder. The coating composition may contain electrically conductive powders and optionally polyamines as a neutralising agent.

An object of the present invention is to provide coating compositions for polyolefin substrates, in particular polypropylene blends, which are aqueous and facilitate not only good adhesion but also electrostatic application of successive layers. The use of chlorinated polyolefins should also be reduced.

This object is achieved by a coating composition based on crosslinking water-dilutable two-component resin systems, which optionally contain chlorinated and/or non-chlorinated polyolefins and small proportions of organic solvent.

The coating composition according to the invention is characterised in that it contains 7.5 to 25 wt. % of one or more epoxy resins 1.5 to 10 wt. % of one or more water-miscible polyamines 0 to 10 wt. % of one or more chlorinated and/or non-chlorinated polyolefins 1 to 35 wt. % of electrically conductive pigments and/or extenders 5 to 25 wt. % of one or more organic solvents and 35 to 60 wt. % of water wherein the sum of the above-stated constituents amounts to 100 wt. % and the coating composition additionally contains conventional lacquer additives, pigments and/or extenders and optionally further binders. The above weight percentages relate, where they concern resins, to resin solids. The coating composition contains water as its principal solvent.

The coating composition according to the invention should be in the form of a two-component coating composition and be mixed and converted into a form suitable for application only immediately prior to application. One component contains the epoxy constituents and the other component the polyamine crosslinking constituents. It is immaterial whether the polyolefins, the solvents, optional further binders, conductive pigments and optional further pigments or additives are present in the epoxy resin component or in the amino resin component. Care must, however, be taken to ensure the storage stability of the individual components. It has proved favourable to introduce the pigments into the amine component and the polyolefin constituents preferably into the epoxy component.

Both components of the coating composition exhibit surprisingly long storage stability, possibly of up to one year.

The quantity ratios of the conductive pigments and/or extenders should be selected such that successive layers may be applied adequately by electrostatic application. The quantity of these pigments is within a range from 1 to 35 wt. %. The conductive pigments are preferably usable in a quantity of 1 to 25 wt. %.

The quantity ratios between the epoxy component and the amine component are selected such that the ratio of reactive H atoms of the crosslinking component to the epoxy groups of the epoxy component is 0.5:1 to 1.5:1, preferably from 0.9:1 to 1.3:1. Any binders which are optionally additionally present are essentially uninvolved in the crosslinking reaction.

The viscosity of the ready-to-apply coating composition may be adjusted to within the desired ratio by dilution with water.

A coating composition is obtained which crosslinks at temperatures as low as room temperature.

In order to accelerate crosslinking, catalysts may be added or the drying temperature is increased. Temperatures of 60° to 100° C. are preferred.

The epoxy resin components of the aqueous epoxy resin dispersion usable according to the invention may contain conventional commercial water-dilutable di- or polyepoxides. They are used as aqueous dispersions or aqueous solutions. Non-chlorinated epoxy resins are preferably used.

Examples of such polyepoxides are polyglycidyl ethers based on aliphatic and/or aromatic diols, such as for example bisphenol A, bisphenol F, novolaks or polyalkylene glycols, which may be reacted via functional OH groups with compounds containing epoxy groups, such as epichlorohydrin. Further examples of polyepoxide compounds are reaction products of aromatic diphenols with aromatic polycarboxylic acids, for example phthalic or terephthalic or trimellitic acid, to yield polyesters. These are reacted, for example, with 2,3-epoxypropanol to yield the epoxy compounds.

Further examples are glycidyl-functionalised (meth) acrylic polymers. Glycidyl-functional polymers may be copolymerised into these polymers, for example by means of glycidyl (meth)acrylate, or acrylates containing OH groups are modified after polymerisation via the OH group to yield epoxy-containing compounds. The properties of the polymers may optionally be modified by further unsaturated comonomers which may be copolymerised.

The epoxy resins are preferably of a structure such that they are water-dilutable. This may be achieved by incorporating hydrophilic groups, such as non-ionic groups, for example polyether structures, polyol structures or by incorporated ionic groups. It is also possible to convert the epoxy resin in the aqueous phase with additional ionic or non-ionic self-emulsifying epoxy resins. It is preferred to use epoxy resin dispersions containing only self-emulsifying epoxy resins, so that it is unnecessary to use additional emulsifiers. Examples of such aqueous epoxy resin dispersions are described in DE-A 36 43 751, DE-A 30 20 301, U.S. Pat. No. 4,987,163 and DE 44 07 121.

It is, however, also possible to add emulsifiers, wherein the quantity added should be as small as possible. The overall total content of emulsifiers for the individual constituents of the coating composition should be below 0.5%.

The number average molecular weight of the epoxy resins is preferably up to 50000. The lower limit is 350. Usable epoxy resins may thus be in the form of liquid substances (at temperatures of up to 30° C.) or as solid substances. It is preferred to use solid epoxy resins. The epoxide equivalent weight is 250 to 10000.

Conventional polyamine compounds are generally used as the crosslinking component of the two-component coating composition according to the invention. These compounds may be varied within broad limits. They contain reactive amino groups and optionally further functional groups which increase solubility in water. The crosslinking polyamines may be of low molecular weight, but they may, however, also have film-forming properties. A sufficient number of reactive groups must be present. The equivalent weight per active hydrogen atom is preferably from 50 to 500, particularly preferably from 100 to 400. Molecular weight may vary within broad limits, provided that reactivity and water-solubility or water-dispersibility are ensured. A number average molecular weight of 500 to 20000 is preferred.

The polyamine crosslinking component is selected in accordance with its water-dilutability or water-solubility, which is brought about by the number of polar groups, such as for example OH groups, amino groups, urea groups or polyether structures. The crosslinking component may be used as an aqueous dispersion. Aliphatically based polyamine resins are preferred. Suitable polyamines contain two or more primary and/or secondary amino groups. Other functional groups may optionally be present. Examples of suitable polyamines are described in EP-A 0 240 083 or EP-A 0 346 982. Polyamine resins may also be amino-free polymers, which are subsequently converted by modification with an excess of amino groups, for example converted polyglycidyl ethers.

Polyamine-isocyanate addition products may also be used. To this end, conventional polyisocyanates are reacted with polyamide in a quantity such that a sufficient number of reactive amino groups is present after the reaction.

Polyamine addition products prepared from acrylically unsaturated compounds, described for example in U.S. Pat. No. 4,303,563, EP-A 0 262 720, EP-A 0 179 954.

The composition according to the invention may optionally contain chlorinated and/or non-chlorinated polyolefins.

Chlorinated polyolefins which may be used are conventional commercial materials individually or as a mixture. These are in particular chlorinated polyethylene, chlorinated polypropylene or chlorinated copolymers thereof having a degree of chlorination of preferably 10 to 35%. The number average molecular weight of the chlorinated polyolefins is preferably 700 to 70000. The chlorinated polyolefins may be used in modified form, for example by the incorporation of polar groups, such as for example maleic anhydride. They may be used as an organically dissolved resin powder or as an aqueous suspension or emulsion.

In order to reduce or eliminate the content of chlorinated polyolefins in the coating composition according to the invention, a possible alternative is to use non-chlorinated polyolefins, for example according to DE 43 08 349 and JP 03 122 125 or polyolefin/acrylate copolymers according to DE 44 32 985 having an average molecular weight of 1000 to 50000. These polymers may optionally also be used in modified form, for example by the incorporation of polar groups, such as for example maleic anhydride and acrylic acid.

The non-chlorinated polyolefins may be used alone or as a mixture with the chlorinated polyolefins.

The chlorinated and non-chlorinated polyolefins may be used as aqueous dispersions. These dispersions may still contain small proportions of organic solvents originating from the production thereof, together with proportions of ionic or non-ionic emulsifiers. The polyolefin constituent in the coating composition may, for example, be added in the form of a dispersion similar to that in WO93/01 244 or WO90/12 056. Emulsifier content should be kept as low as possible.

Suitable organic solvents are, for example, conventional lacquer solvents. The quantity of organic solvent should be kept as low as possible. Examples of usable solvents are ketones, hydrocarbons, alcohols, glycol ethers, for example xylene, toluene, mesitylene, benzyl alcohol.

The coating compositions according to the invention contain electrically conductive pigments and/or extenders. These may be inorganically or organically based pigments or extenders. Commercially available opaque and transparent electrically conductive pigments and/or extenders may be used, as are for example known for imparting anti-static properties to polymeric coating materials for equipment, surfaces and components. These may be conductively coated barium sulphate, doped tin dioxide, doped zinc oxide, (doped for example with aluminium, gallium, antimony and bismuth), conductively coated potassium titanate together with conductive grades of carbon black and titanium dioxide. These may produce black to white coloured finishes once the coating composition according to the invention has been applied onto the substrate, for example when grades of carbon black or titanium dioxide are used. Other colours may optionally be produced by incorporating coloured pigments. Light colours are preferred.

The pigments may be ground either in the epoxy resin dispersion or, particularly preferably, in the amine component. It is optionally possible, especially for pigments, such as for example carbon blacks, which are difficult to disperse, to use a pigment paste using additional binders (grinding resins), for example based on polyurethane, polyacrylate, polyether and polyester resins. The pigments are finely dispersed therein. The equipment and methods necessary for this purpose are familiar to the person skilled in the art.

Conductive pigments may be present in the composition according to the invention in an amount of 1 wt. % to 35 wt. %. Preferably, contents of 1 to 5 wt. % are used in dark to black pigments and 5 to 25 wt. % in grey to light pigments.

The coating compositions may optionally contain further pigments and additives. Usable additives are conventional lacquer additives such as wetting agents, dispersion auxiliaries, anti-foaming agents, levelling promoters, catalysts, rheological additives and anti-cratering agents.

Further binders, which preferably do not react with the crosslinking components, may optionally also be present in the coating compositions. These may be, for example, aqueous polyurethane, polyester, copolymer dispersions or aqueous dispersions prepared from mixtures of such resins, which are compatible with the epoxy resin dispersion. It is also possible to use these dispersions together with the amine crosslinking agent.

In order to use the two-component coating composition, a mixture is prepared of each of the components with the remaining constituents according to the invention. These mixtures are mixed together immediately before application. The resultant coating composition is immediately ready for application.

Preferred substrates are plastic substrates, in particular modified or unmodified polyolefin substrates. Examples of these are in particular polyethylene or polypropylene substrates, together with substrates made from copolymers or blends thereof.

The coating composition is applied onto the preferably unpretreated substrate, optionally after it has been cleaned. The coating is then chemically crosslinked, which may optionally be promoted by elevated temperatures of up to 100° C. The crosslinking temperature of the coating composition may be selected as a function of the temperature sensitivity of the substrate, as the coating compositions according to the invention can crosslink over a broad range of temperatures. A temperature range of 60° to 100° C. is preferred. After crosslinking, a homogeneously coated plastic substrate having a defect-free surface is obtained. The coatings obtained are distinguished by elevated water resistance, by good adhesion to the substrate, despite the reduction in content of chlorinated polyolefins (CPO) or the use of non-chlorinated polyolefins and by good low-temperature impact strength.

According to a less preferred embodiment of the invention, no chlorinated or no non-chlorinated polyolefins are used in the coating composition. In this case, the polyolefin plastic substrates are pretreated using conventional methods such as flame treatment or low pressure plasma activation in order to achieve good adhesion of the coatings according to the invention.

The coating compositions according to the invention are in particular used as conductive primers. Further coatings, for example base coat/clear lacquer coatings or plain topcoat lacquers may then be applied onto the resultant conductive plastic coating using electrostatic methods. In comparison with conventional application methods, these allow a distinct reduction in overspray.

The resultant multi-layer structures exhibit very good adhesion to the substrate, good low temperature elasticity and no detachment phenomena when exposed to moisture. They may be used without additional primers and optionally without additional pretreatment of the substrates.

The following examples illustrate the invention.

EXAMPLE 1
Production of an electrically conductive titanium dioxide paste 25.6 parts of ethylene glycol monobutyl ether, 1.8 parts of a 10% aqueous dimethylethanolamine solution and 5.1 parts of completely deionised water are added in the stated sequence to 35.2 parts of a conventional commercial dispersion additive. 31.5 parts of a conventional commercial electrically conductive titanium dioxide and 0.8 parts of a conventional commercial defoamer are stirred into this initial mixture and predispersed for 20 minutes. After overnight swelling, main dispersion is performed in a discontinuously operated dispersion apparatus.

EXAMPLE 2
Production of an electrically conductive barium sulphate paste 12.0 parts of ethylene glycol monobutyl ether, 17.2 parts of water, 4.3 parts of a 10% aqueous dimethylethanolamine solution (DMEA solution) and 0.2 parts of a conventional commercial defoamer are added in the stated sequence to 13.8 parts of a conventional commercial dispersion additive. 2.5 parts of a conventional commercial electrically conductive barium sulphate are stirred in. The mixture is predispersed for 20 minutes and, after overnight swelling, dispersed as in Example 1.

EXAMPLE 3
Production of an electrically conductive carbon black paste 18.6 parts of ethylene glycol monobutyl ether, 26.6 parts of water, 6.6 parts of a 10% aqueous DMEA solution, 0.3 parts of a conventional commercial defoamer, 17.3 parts of a conventional commercial conductive carbon black and 9.3 parts of DMEA solution are stirred into 21.3 parts of a conventional commercial dispersion additive. Dispersion is performed as in Example 1.

EXAMPLE 4
Production of a titanium dioxide paste 8.4 parts of ethylene glycol monobutyl ether, 3.0 parts of a 10% aqueous DMEA solution and 12.4 parts of water are added to 9.7 parts of a conventional commercial dispersion additive. 66.3 parts of a conventional commercial titanium dioxide and 0.2 parts of a conventional commercial defoamer are stirred into this initial mixture. Dispersion is performed as in Example 1.

EXAMPLE 5
Production of a coating composition according to the invention 12 parts of the paste from Example 3 are stirred into an initial amount of 46 parts of the paste from Example 4. Into this is first stirred a mixture of 14.1 parts of a commercially available non-ionic polyurethane dispersion (aliphatic isocyanate and polyester structural units, solids content 40%), 1 part of methylpyrrolidone together with a mixture of 10 parts of a conventional commercial aliphatic polyamine, 1.9 parts of propylene glycol dimethyl ether and 1.8 parts of water. The formulation is completed with 0.6 parts of dimethylethanolamine, 1.9 parts of a conventional commercial thickener (20% in water, based on acrylate) and 7.5 parts of water.

3 parts of xylene are mixed into 97 parts of an epoxy resin dispersion (based on bisphenol A).

A coating composition is prepared from 100 parts of the pigmented amine resin component and 45 parts of the epoxy resin component and optionally adjusted with a little water to an application viscosity of 30 to 40 seconds (DIN 4 cup) before spray application.

EXAMPLE 6
Production of a coating composition according to the invention 25 parts of the paste from Example 2 are stirred into an initial amount of 43.2 parts of the paste from Example 1. Into this are stirred 23 parts of a commercially available CPO emulsion (20% in water) and combined with a mixture of 5.6 parts of a conventional commercial aliphatic polyamine and 1.1 parts of propylene glycol dimethyl ether. The formulation is completed with 1.7 parts of a conventional commercial thickener (30% in water, based on acrylate) and 0.4 parts of DMEA.

3 parts of xylene are mixed into 97 parts of an epoxy resin dispersion (based on bisphenol A).

A coating composition is prepared from 100 parts of the pigmented amine resin component and 30 parts of the epoxy resin component and optionally adjusted with a little water to an application viscosity of 30 to 40 seconds (DIN 4 cup) before spray application.

EXAMPLE 7
Production of a coating composition according to the invention

To an initial amount consisting of 16.2 parts of water, 3.6 parts of ethylene glycol monobutyl ether, 3.2 parts of two different conventional commercial dispersion additives and 6.5 parts of a conventional commercial aliphatic polyamine are added first 2.9 parts of a conventional commercial conductive carbon black, then 9.7 parts of a conventional commercial titanium dioxide and, after dilution with 14 parts of water, predispersed for 10 minutes at a maximum of 35° C. Into this are stirred 1.4 parts of a conventional commercial non-ionic emulsifier (10% in water). A solution prepared from 1.2 parts of a conventional commercial CPO emulsion (20% in water) and 4.8 parts of xylene is dispersed into this with the greatest possible shearing, before the entire initial amount is then homogenised and stabilised in a continuous dispersion process at a maximum of 35° C. After cooling, 2.8 parts of conventional commercial thickener (20% in water, based on acrylate) and 0.6 parts of DMEA are added and a DIN 4 cup viscosity of approximately 60 to 70 seconds is established by slowly stirring in water.

54 parts of an epoxy resin dispersion (based on bisphenol A) are mixed with 6 parts of a conventional commercial non-ionic emulsifier (10% in water). To this is added with maximum shearing a solution prepared from 7.8 parts of a CPO emulsion (20% in water) and 23.2 parts of xylene and the mixture dispersed for approximately half an hour. After approximately 12 hours, the formulation is completed with 6 parts of water.

A coating composition is prepared from 100 parts of the pigmented amine resin component and 66 parts of the epoxy resin component and optionally adjusted with a little water to an application viscosity of 30 to 40 seconds (DIN 4 cup) before spray application.

EXAMPLE 8
Production of primer coat

The coating compositions from Examples 5 to 7 are applied by pressure vessel application to a dry film thickness of 20 to 30 μm onto the precleaned (degreased), unpretreated substrate (conventional commercial polypropylene blends, for example Keltan TP 0550, Keltan TP 2632, Hostacom X-4305, Statiol XPR 486). Drying was performed for 30 minutes at 80° C. in a circulating air oven. Surface resistance values, measured in each case with a flexible tongue electrode, are approximately 2.5 to 40 kOhm (DIN 53 482). A conventional commercial topcoat lacquer (consisting of a base coat/clear two coat system) is then applied electrostatically. Testing for adhesion to successive layers (DIN 531, including adhesive tape pull-off test), moisture exposure resistance (DIN 50 017 KK) and low temperature elasticity (DIN 53 443, part 2) shows very good results.

We claim:

1. An aqueous coating composition suitable for coating plastic substrates comprising:

7.5 to 25 wt. % of one or more epoxy resins 1.5 to 10 wt. % of one or more water-miscible polyamines 0 to 10 wt. % of one or more non-chlorinated polyolefins 1 to 35 wt. % of an electrically conductive pigment 5 to 25 wt. % of one or more organic solvents and 35 to 60 wt. % of water wherein the sum of the above-stated constituents amounts to 100 wt. %.

2. A coating composition according to claim 1, wherein the content of the electrically conductive pigment is 1 to 25 wt. %.

3. A coating composition according to claim 1, wherein the ratio of the reactive hydrogen atoms of the polyamines to the epoxy groups of the epoxy resins is 0.5:1 to 1.5:1.

4. A coating composition according to claim 3, wherein the ratio of the reactive hydrogen atoms of the polyamines to the epoxy groups of the epoxy resins is 0.9:1 to 1.3:1.

5. A coating composition according to claim 1, wherein the number average molecular weight of the epoxy resins is 350 to 50000.

6. A coating composition according to claim 1, wherein the epoxide equivalent weight of the epoxy resins is 250 to 10000.

7. A coating composition according to claim 1, wherein the equivalent weight of the polyamines relative to active hydrogen is 50 to 500.

8. A coating composition according to claim 7, wherein the equivalent weight of the polyamines relative to active hydrogen is 100 to 400.

9. A coating composition according to claim 1, wherein the polyamines have a number average molecular weight of 500 to 20000.

10. A coating composition according to claim 1 further comprising a material selected from the group consisting of lacquer additive, a non-conductive pigment, a binder that does not react with the cross-linking components and any combination thereof.

* * * * *